May 13, 1958     R. ANTONSEN ET AL     2,834,044

APPARATUS FOR WETTING FINELY-DIVIDED PIGMENTS

Filed Dec. 10, 1954

INVENTORS
Randolph Antonsen
and Robert O. Beattie by Kenneth W. Brown, Atty

United States Patent Office 2,834,044
Patented May 13, 1958

2,834,044

APPARATUS FOR WETTING FINELY-DIVIDED PIGMENTS

Randolph Antonsen, Boston, and Robert D. Beattie, Cambridge, Mass., assignors to Godfrey L. Cabot, Inc., Boston, Mass., a corporation of Massachusetts Application December 10, 1954, Serial No. 474,512

8 Claims. (Cl. 18—1)

This invention relates to apparatus for pelletizing finely divided solids with liquids. More particularly, it relates to a novel apparatus for wetting finely-divided solids during pelletization in a revolving drum. The invention is particularly useful for pelletizing carbon blacks, especially with the aid of combustible liquids, such as oils.

Very fine, high surface area powders are quite absorbent, commonly being capable of taking up more than their own weight of most liquids without losing their free flowing character. Uniformly spraying or impregnating such powder with liquid, especially with less than equal amounts of liquid by weight, has always been a difficult problem. This problem is frequently encountered in the field of pelletization where the presence of liquid is often of tremendous assistance, but where, for various reasons, the amount of liquid which it is desired to use is quite limited.

One object of this invention is to provide an improved apparatus for spraying or impregnating powders with liquid.

Another important object is to provide a pelletizing apparatus for uniformly applying less than equal amounts by weight of liquid to the dry solid to be pelletized.

Still another object is to provide a highly flexible and versatile apparatus and process for pelletizing powders with the aid of liquids.

A more specific object of the invention is to provide an apparatus particularly suited for the pelletization of carbon blacks with the aid of volatile combustible liquids.

Additional objects and other advantageous features of this invention will be apparent from the following detailed description and discussion when considered in connection with the accompanying drawings in which—

Figure 1:
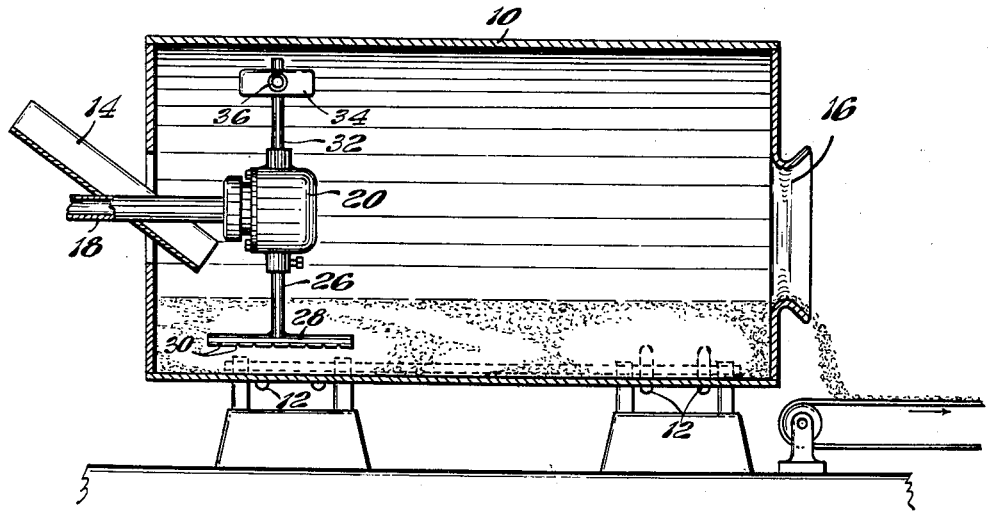
Figure 2:
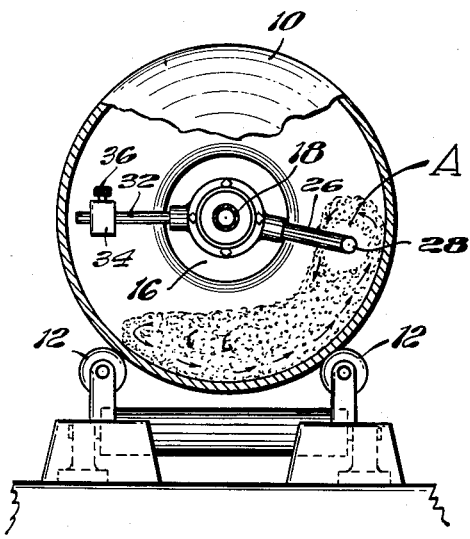
Figure 3:
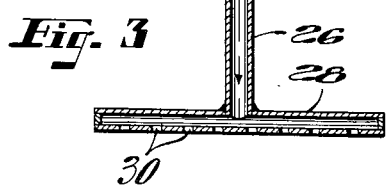

Fig. 1 is a sectional view in side elevation of a conventional pelleting drum showing the fluids distributor assembly in an at rest position therein, Fig. 2 is an end view looking into the drum of Fig. 1 showing the fluids distributor in operating position, and Fig. 3 is an enlarged cross sectional view of the fluids distributor.

The apparatus comprises a metal drum 10 of suitable size, for example 48 feet long and 8 feet in diameter, supported for rotation on driven rubber tired wheels 12. A pigment feed chute 14 is mounted to deliver the raw material to the inlet end of the drums and opening 16 is provided at the outlet end thereof to discharge treated product from the drum. Other means for mounting, rotating, loading and emptying the drum are well known to those skilled in the art and may be employed as desired.

The principal novelty of this invention resides in the means for impregnating the pigment with liquid in a zone enclosed within the body of pigment being treated in the drum. It is by means of the practice of this invention that volatile combustible liquids can be employed in the pelletization of pigments with safety. Many such liquids could not heretofore be used for the purpose because of the extreme explosion hazard prevailing when the liquid was sprayed onto the surface of the hot pigment in the drum. Thus this invention has for the first time made wholly practicable, for example, the pelletization of carbon black with volatile ink vehicles. As is well known in the art, the pelleting process generates considerable heat and the lighter oils will readily vaporize in the zone above the bed of pigment if sprayed into the drum by prior known means. Thus the vapors constitute a danger and further are lost to the process, which is a serious waste of expensive oil.

The novel spray device of this invention comprises a supply conduit 18 supported externally of the drum and extending thereinto more or less axially. Within the drum the liquid distributor assembly 20 is connected to conduit 18 by means of a swivel mounting. This mounting is so arranged that the spray is free to swing from side to side in an arc around the conduit for positioning in the pigment bed as hereinafter described.

The fluids distributor assembly of the invention shown in detail in Fig. 3 includes a fluid tight swivel coupling 20 mounted on supply conduit 18 for rotation by means of ball bearings 22 and packing 24, and a radial delivery pipe 26 connected into the side wall of coupling 20. Connected to the end of delivery pipe is a fluids spray, here shown as a long pipe 28 provided with a plurality of orifices 30. Extending from the housing of coupling 20 circumferentially offset from delivery pipe 26 is counterbalancing arm 32 supporting thereon a movable counterweight 34 provided with locking screw 36 or other suitable means for fixing the weight in position. Delivery pipe 26 is also made adjustable and, as illustrated, is arranged to slide a limited distance through the housing of coupling 20, being held in position by means of locking screw 38. Various means for mounting swivel coupling 20, counterweight 34 and delivery pipe 26 will occur to those skilled in the art and are contemplated by this invention. It is merely necessary that sufficient adjustment be provided for so that the spray will automatically position itself in the drum during operation as hereinafter described.

The pigment bed in a rotating drum conforms to a regular pattern of movement which differs as between different grades of pigment only in extent. The rotation of the drum, whether clockwise, or counterclockwise as illustrated in Figure 2, lifts a portion of the solids in the bed along the rising side wall of the drum to a height considerably above that representative of the high side of the bed surface when shifted to its maximum angle of repose. As a result of this action, material is carried from the lower part of the bed up the rising side wall of the drum and then curls over and falls back away from the side wall toward the center of the drum. In this manner the circulation of solids in such a rotation bed tends to be systematized in a general cross flow pattern as indicated schematically by the small arrows in Figure 2. This systematic circulation of solids is accentuated at the high side of the bed where the relatively thin layer of cresting solids makes its relatively quick turn or loop. Within this loop or breaking crest of material, there will be a relatively calm or static zone or "eye" A, which is the center of circulation for the revolving layer of cresting solids. The concentration of solids in this zone A will usually tend to be somewhat reduced in comparison to that in the layer of circulating material surrounding same.

It will be seen from an analysis of the forces in the above-described rotating solids bed that there will be a net force tending to raise and hold any freely swinging arm extending to the radial depth of the area defined as zone A, such as the spray pipe unit of this invention, so that it points to said zone. Therefore, it is only necessary to use a spray pipe unit which is sufficiently light in weight or properly counterbalanced so as to respond to this net force in the bed, and then, provided spray 28 is the same radial distance from the center of the drum as is zone A, the said spray 28 will automatically be positioned in zone A. In this way, the uniform distribution of the sprayed liquids is assured because the solids in the layer circulating about zone A are thoroughly dispersed and spread out for proper exposure to the liquid spray. As a result, the sprayed liquid is distributed uniformly over the entire pigment because of the systematic circulation of the entire bed through the loop or path about zone A. Moreover, the sprayed liquid will be safely confined beneath the surface of the tumbling solids, and the explosion hazard normally encountered in the use of a volatile combustible fluid in a pelletization drum, e. g., in spraying oil on a bed of carbon black, is thus removed.

In addition, there are other extra and valuable advantages obtainable from the use of the free-swinging adjustable spray unit described above. First, since the spray unit is free to move with, and is positioned automatically by, the forces in the bed, there is no chance that forces in the bed or sudden shifts in weight, etc., might shear off the liquid feed pipe. Secondly, interference of the spray unit with the normal movement and circulation of the bed, and crushing and destruction of pellets thereby are all reduced to a minimum. Also, the problem of making adjustments to accommodate changes in rotation speed, bed depth, pigment type and other operating conditions is simplified in the present invention.

As we have said, the fluids distributor 20 may be constructed in any convenient manner whereby the proper balance or weight distribution is obtained. Spray pipe 28 should be adjustably spaced from the axis of rotation of its swivel suspension joint and counterweight 34 may be provided, if necessary, and, in this case, may also be adjustably spaced from said joint.

Spray pipe 28 may extend any desired distance along the drum, even for the full length thereof. Normally, however, it is preferred to deliver the liquid to the pigment in the first pelleting stage so that the spray will be positioned near the drum inlet end and will not ordinarily extend beyond about the first 20% of the length of the drum.

The following is a specific example of the operation and perfomance obtainable by the practice of this invention.

*Example 1*

A substantially horizontal rotatably mounted commercial pelletizing drum 8 feet in diameter and 48 feet long, having openings in the center of each end is initially charged to a central depth of about 18" with a mixture of (1) fluffy carbon black impregnated with about 6% by weight based on the dry black of nonpolymerizable mineral oil suitable for use in the vehicle of newsinks and (2) seed pellets of carbon black containing the equivalent amount of the same oil. With the drum rotating at a speed of about 15 R. P. M., dry fluffy black containing no oil is fed by gravity into one end of the drum at the rate of about 1000 lbs./hr. The same type mineral oil is applied to the bed of black at the rate of about 60 lbs./hr. through a single wide angle (120°) full cone spray nozzle located at the end of a connecting conduit arm about 3'3" long which swings freely suspended by means of a swivel joint connecting at right angles to the end of a liquid feed pipe about 1 foot inside of and externally supported and concentrically mounted in the inlet end of the drum. Finished pellets are removed from the opposite or outlet end of the drum by means of a scoop and conveyor at the rate of about 1050 lbs./hr., thus maintaining a central bed depth of about 18" representing about 15% of the volume of the drum. The finished pellets are uniform in size and composition, containing 6% mineral oil based on the dry black, and are readily dispersible in newsink vehicles for the preparation of newsinks.

Although a drum open at both ends, such as described above, is preferred for the practice of this invention, a drum open at only one end can be used if desired. It is merely necessary that the pivot point on the liquid feed pipe from which the connecting conduit arm member is suspended be located more or less concentrically in the drum and that the means for feeding and discharging solids be located so as not to interfere with the rotation of the drum or the free swing of the spray pipe assembly.

Also, the character of the atomizing nozzle or nozzles is not critical. Good liquid distribution can be obtained by either gas or pressure atomization. Any symmetrical spray pattern may be used such as conical, flat dished, etc. Multiple nozzles and/or wide angle nozzles are preferred. In conjunction with the process, both the liquid being sprayed and the powders being treated may be either hot or cold. Moreover, the drum and/or its contents may be either heated or cooled during the process, e. g. by circulating a suitable fluid around or over the drum or by passing a suitable gas through the drum.

*Example 2*

The same pelletizing drum as in Example 1 is filled to a maximum depth (at the center of bed) of about 16" with a mixture of (1) fluffy carbon black wetted with about 50% by weight based on the dry black of water and (2) seed pellets containing the equivalent amount of water. With the drum rotating at a speed of 12 R. P. M. dry fluffy black is fed to one end of the drum at a rate of about 1200 lbs./hr. Meanwhile, water is sprayed at the rate of about 600 lbs./hr. through 3 spray nozzles spaced apart about 9" on centers on a distributor pipe attached at its mid point at right angles to a radially extending liquid passage arm about 3'5" long suspended by means of a freely rotating liquid-tight swivel joint from the end of a liquid feed conduit about 2 feet inside and externally supported and concentrically mounted in the inlet end of the drum. Each of the 3 spray nozzles gives a flat fan shaped fog pattern with an 80° subtended angle and are oriented so that the maximum width of coverage is along the length of the drum. Finished pellets of a very uniform size and composition are removed from the outlet end of the drum at the rate of about 1800 lbs./hr. These pellets may be dried to a moisture content of only 5 to 10% before shipment or use. In any case, they are approximately spherical in shape and sufficiently strong, dustless and free flowing to be handled readily and conveniently in bulk.

It is understood that the above examples are illustrative only and are not to be taken as limiting in any way the scope of the present invention.

Having thus described our invention and preferred embodiments thereof, we claim:

1. In apparatus for pelleting finely-divided pigments, including a rotatable drum, the improvement which comprises a fixed liquid supply conduit extending into said drum approximately in the axis thereof, a substantially liquid-tight swivel joint connected to and supported by the discharge end of said conduit, a longitudinally adjustable branch conduit radially connected into the swivel joint, a spray distributor connected to the end of said branch conduit, adjustable counterbalancing means for the branch conduit and spray distributor affixed to the swivel joint, and means to deliver liquid under pressure to the supply conduit.

2. The apparatus of claim 1 further characterized by the spray distributor being an atomizing nozzle.

3. The apparatus of claim 1 further characterized by the spray distributor being a pipe having a plurality of orifices spaced therealong.

4. In apparatus for pelleting finely-divided pigments, including a rotatable drum, the improvement which consists in an automatically positionable liquids distributor comprising an adjustably counterbalanced delivery conduit terminating in a spray distributor radially connected into a substantially liquid-tight swivel joint rotatably mounted on the discharge end of a fixed supply conduit extending into the drum substantially along the axis thereof, the delivery conduit being adjustable in length whereby the spray distributor may be located in the zone of low pigments concentration during agitation thereof in said drum, and means to deliver liquids under pressure to said supply conduit.

5. Apparatus for impregnating powdered solids with liquid during pelletization in a rotatably mounted drum disposed in a generally horizontal position having means for feeding powdered solids to one end of said drum and means for discharging treated solids from the opposite end of said drum, comprising a liquid feed conduit supported externally of said drum and extending into said drum through an opening in one end thereof, a radial conduit arm member adjustably mounted on and connected to said liquid feed conduit at a point on the axis of said drum by means of a substantially liquid-tight swivel joint suspension and connection so as to provide free rotation of said arm member about said point in a plane normal to the axis of said drum, liquid atomizing means connecting with the passage inside said conduit arm member and directed symmetrically outward away from the center of said drum, said atomizing means being located on said arm member at a radial distance corresponding to the location of the relatively calm center-of-circulation zone which is formed by solids falling back away from the high side of the bed after being carried up the upmoving surface of the rotating drum, and adjustable counterbalancing means whereby the weight distribution of said arm member may be balanced so that the forces against said arm member created by the solids in the rotating drum will automatically position the said atomizing means within the said center-of-circulation zone.

6. The apparatus of claim 5 in which the liquid atomizing means is located in that half of the drum nearest the inlet end thereof.

7. The apparatus of claim 5 in which the liquid atomizing means comprises at least one wide angle spray nozzle.

8. The apparatus of claim 5 in which the liquid atomizing means comprises a distributor pipe mounted on said connecting conduit arm so as to lie parallel to the axis of said drum having a plurality of multiple wide angle spray nozzles arranged symmetrically therealong.

References Cited in the file of this patent

UNITED STATES PATENTS

| | | |
|---|---|---|
| 2,293,439 | Lloyd | Aug. 18, 1942 |
| 2,368,402 | Ball | Jan. 30, 1945 |
| 2,436,771 | Hood | Feb. 24, 1948 |
| 2,669,381 | King | Jan. 11, 1955 |